United States Patent [19]
Roberts et al.

[11] Patent Number: 5,540,545
[45] Date of Patent: Jul. 30, 1996

[54] PALLETIZING SYSTEM

[75] Inventors: Shayne A. Roberts, Phillips; John J. Kondratuk, Kennan, both of Wis.

[73] Assignee: Marquip, Inc., Phillips, Wis.

[21] Appl. No.: 418,503

[22] Filed: Apr. 7, 1995

[51] Int. Cl.$^6$ ............................................. B65G 57/22
[52] U.S. Cl. .................. 414/792.6; 414/786; 414/789.6; 414/791.8; 414/794.7; 414/907
[58] Field of Search ................. 414/786, 789.6, 414/791.8, 791.9, 792, 792.6, 794.7, 902, 907

[56] References Cited

U.S. PATENT DOCUMENTS

| | | | |
|---|---|---|---|
| 2,699,264 | 1/1955 | Bruce et al. . | |
| 2,971,659 | 2/1961 | Miller, Jr. | 414/792 |
| 2,997,187 | 8/1961 | Burt . | |
| 3,448,867 | 6/1969 | Raynor et al. | 414/792.6 |
| 3,608,746 | 9/1971 | Meyer | 414/789.6 |
| 3,700,127 | 10/1972 | Kurk et al. | 414/792 |
| 3,941,236 | 3/1976 | Hagedorn | 414/794.7 |
| 4,255,074 | 3/1981 | Meratti et al. . | |
| 4,352,616 | 10/1982 | Brenner . | |
| 4,900,219 | 2/1990 | Azzopardi et al. | 414/907 |
| 5,139,388 | 8/1992 | Martin . | |
| 5,372,472 | 12/1994 | Winski et al. | 414/789.6 |

FOREIGN PATENT DOCUMENTS 0219780  4/1987  European Pat. Off. ............. 414/907

*Primary Examiner*—Karen B. Merritt
*Assistant Examiner*—Douglas Hess
*Attorney, Agent, or Firm*—Andrus, Sceales, Starke & Sawall

[57] ABSTRACT

A palletizing system adapted particularly to the formation of stacks of rectangular prismatic shaped articles utilizes a conventional vertical stacking station which is uniquely supplied with tiers of articles alternately formed on and deposited from opposite sides of the stacking station. Virtually continuous tier and stack formation is possible and common control routines may be utilized to form tiers from multiple rows of articles.

10 Claims, 15 Drawing Sheets

PALLETIZING SYSTEM

BACKGROUND OF THE INVENTION

The present invention pertains to the palletizing of articles or the formation of stacks comprising ordered layers of such articles, which articles may themselves comprise layered stacks.

Palletizing systems are well known in the prior art and are utilized to build large, generally prismatic stacks of articles into a compact arrangement for shipping. The articles which are palletized also typically have a rectangular prismatic shape and may themselves comprise either unitary packages or stacks of identical layered items. Each palletized stack typically comprises multiple layers or tiers, stacked one atop another, each of which tiers comprises a plurality of rows of articles. The stacks may be formed on and supported by a shipping pallet or may be formed directly on a conveyor bed or other transfer mechanism.

For palletizing systems which are designed to handle articles of different sizes and shapes, it is generally desirable to form stacks having the same outside dimensions, particularly around the perimeter, so that the stacks substantially conform to the area of the pallets on which they are formed, provide uniformity in size and shape for shipping and storage, and can be wrapped or banded with equipment and materials operated in a uniform manner. Thus, it is often desirable or necessary to form tiers of articles in which there are gaps or spaces between adjacent articles or adjacent rows of articles in order that the tier assumes the shape of the outer perimeter of the stack being formed. For space and shape optimization, it is also often necessary to rotate articles 90° about a vertical axis with respect to other articles forming a tier or one of the tier-forming rows.

U.S. Pat. Nos. 2,699,264; 2,997,187; 4,255,074; 4,352,616 and 5,139,388 all disclose systems for forming stacks of articles from multi-article tiers placed one atop another. In each of the foregoing patents, the individual articles are first formed in rows and a plurality of rows are assembled to form a tier. The tiers are sequentially placed atop a pallet or previously deposited tier, or in the case of the system disclosed in U.S. Pat. No. 2,997,187, each tier is inserted beneath a previously positioned tier or stack of tiers. Each of the foregoing patents discloses some means for reorienting or spacing articles with respect to adjacent articles in a row or in a tier.

However, in all of the above identified prior art systems, a single tier is formed at a time and transferred onto the stack with some sort of transfer or shuttle mechanism on which the tier is formed. Thus, during tier transfer, there is an inevitable delay while the transfer mechanism is moving to and returning from depositing the tier on the stack.

SUMMARY OF THE INVENTION

In accordance with the present invention, a palletizing system for forming a vertical stack of multiple tiers of articles, each of which tiers is in turn formed from a plurality of the articles, includes a stack forming station in which tiers are subsequently deposited, a first tier forming station in which first tiers of articles are formed, a second tier forming station in which second tiers of articles are formed, and stacking means for alternately moving a first tier and a second tier into the stack forming station to provide the sequentially deposited stack of tiers.

Preferably, the two tier forming stations are positioned on opposite sides of the stack forming station. The palletizing system includes a first conveyor system on which articles or rows of articles are moved serially into the first tier forming station, and a second conveyor system on which articles or rows of articles are moved serially into the second tier forming station. Each of the conveyor systems preferably comprises an in-feed conveyor, a tier forming station conveyor which is operatively connected to the downstream end of the in-feed conveyor and adapted to received articles therefrom, and an article orienting device which is operatively connected to the upstream end of the in-feed conveyor and is adapted to selectively position articles for placement on the in-feed conveyor. Each in-feed conveyor and its associated tier forming station conveyor are operative to form rows of articles, and the latter is operative to form tiers of a plurality of rows of articles.

In one embodiment, the tier forming stations are operative to form tiers which are horizontally asymmetric. Preferably, each succeeding asymmetric tier is formed as a mirror image or modified mirror image of the preceding tier.

In the preferred embodiment of the invention, each of the first and second tier forming stations includes means for sequentially forming rows of articles, and means for sequentially forming tiers from said sequentially formed rows. The tier forming means includes transfer means for moving each tier into the stack forming station.

The method of the present invention comprises the steps of: forming separate tiers on opposite sides of a stack forming station, alternately transferring the tiers from said opposite sides into the stack forming station, and depositing each succeeding tier on the preceding tier.

The method also includes the step of forming tiers which are horizontally asymmetric, including the modified step of causing each succeeding asymmetric tier to be formed as a mirror image of the preceding tier.

The method also includes the steps of forming successive rows of articles, and arranging a plurality of said rows in side-by-side relation to form the tier. The method further includes the steps of conveying the articles for each row linearly to form said row on the line of conveying, and moving each formed row in a direction perpendicular to the line of conveying into the side-by-side relation in the tier.

DETAILED DESCRIPTION OF THE PREFERRED EMBODIMENT

Figure 1:
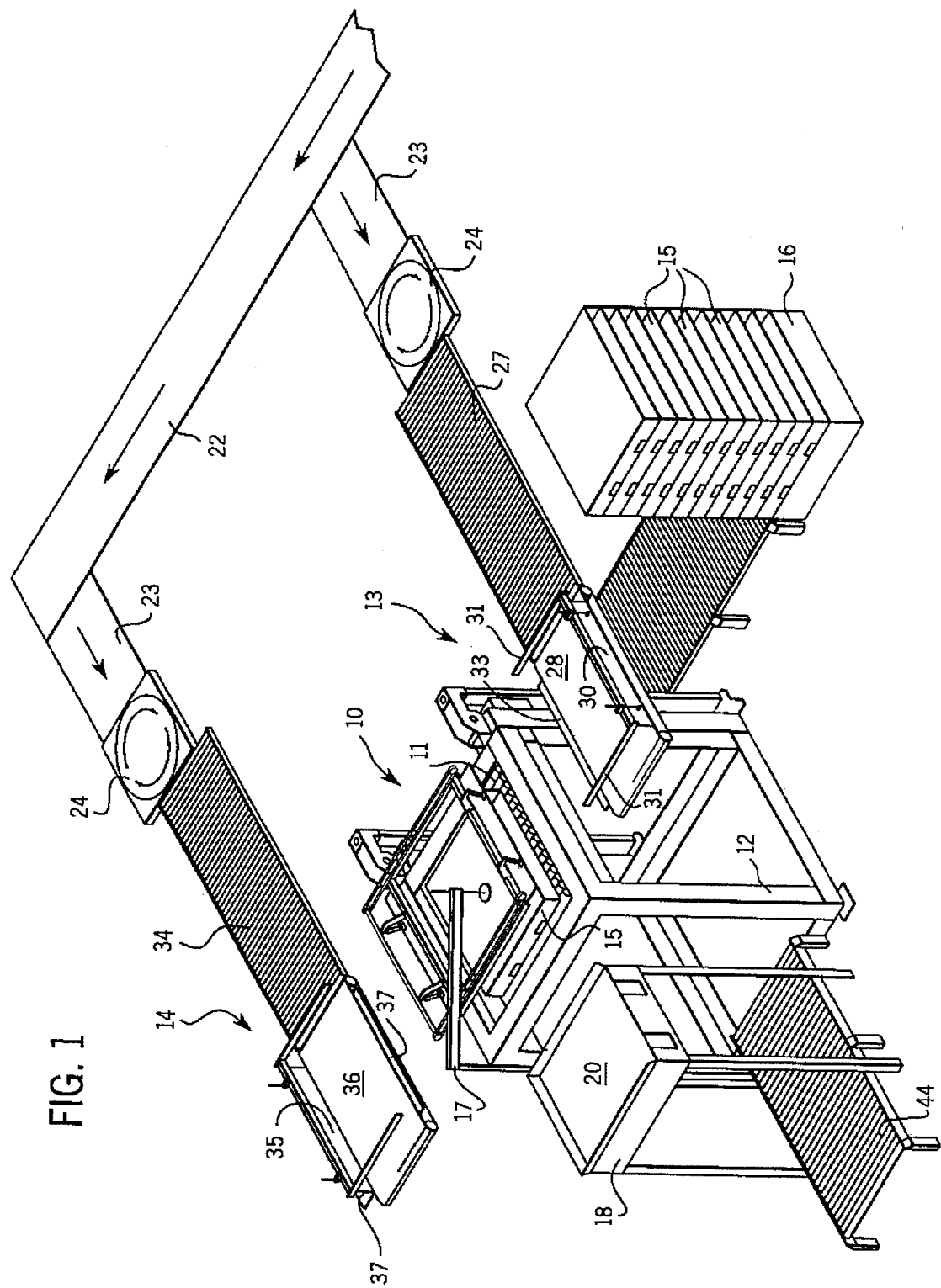
FIG. 1 is a perspective view of the palletizing system of the present invention.

Referring to FIG. 1, the palletizing system of the present invention includes a centrally located stacking station 10 in which a pallet-supporting platform 11 is supported for vertical movement within an open frame 12. The stacking station 10 is positioned between a first tier forming station 13 and a second tier forming station 14 from which layered tiers of articles are alternately transferred into the stacking station 10 for placement atop one another to form a stack of multiple tiers on the pallet supporting platform 11. Preferably, the stack is formed directly on a pallet 15 which is initially placed on the supporting platform 11 from an automatic pallet feeder 16. With the pallet supporting platform 11 in its lowermost position within the open frame 12, a pallet 15 is delivered to the platform which is then raised to its uppermost position, shown in FIG. 1, for the start of a stacking sequence. The system may also include a tie sheet feeder 17 which transfers a tie sheet 20 from a supply bin 18 to the top of the pallet 15 and each tier of articles moved into the stacking station to separate adjacent tiers, as is well known in the art. The tie sheet feeder 17 may utilize a rotary arm to carry a sheet from the bin 18 to the pallet 15 or may use a linear feed system.

Figure 18:
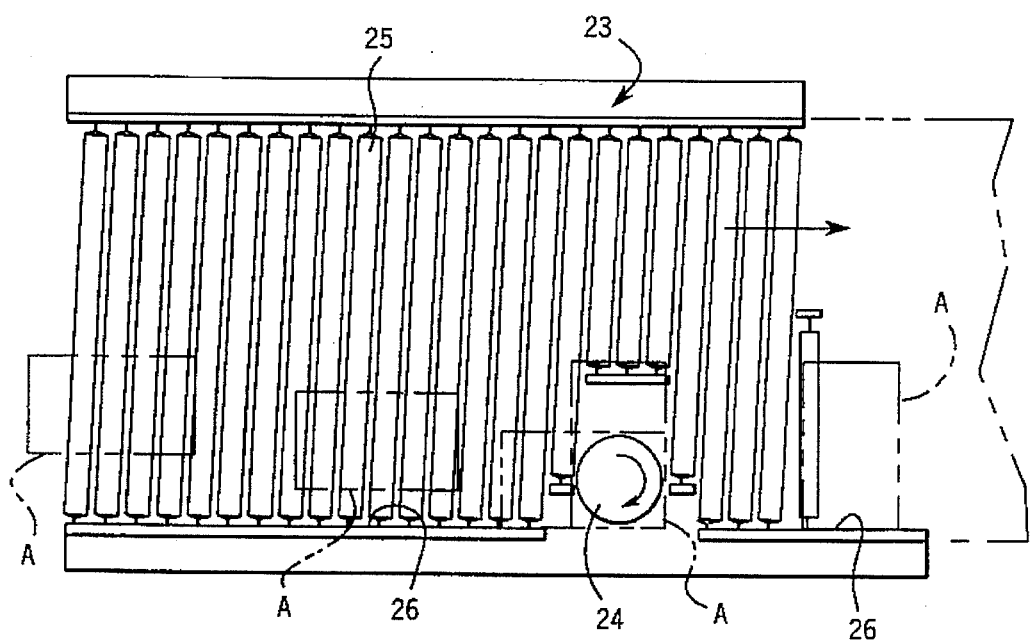
FIG. 18 is a top plan view of a rotating device used to provide 90° reorientation of selected articles in a formed row.

The articles A to be palletized may be supplied from a single source by a supply conveyor system 21 which may include a cross conveyor 22 operating between a feed conveyor 23 for each tier forming station 13 and 14. Each feed conveyor 23 supplies articles A one at a time to an article orienting device in the form of a turntable or article rotator 24. As indicated previously, the articles A typically have a rectangular prismatic shape and may be either unitary boxes or stacks of layered items, such as sheets of paperboard, books, or the like. Regardless of the specific nature of the articles A, each feed conveyor 23 operates to orient one side face of the article in a common vertical plane as it is conveyed onto the article rotator 24. Further, if the article is reoriented by the rotator, as by turning the article 90° about a vertical axis, the reoriented side face of the article must also be maintained in the same common vertical plane. FIG. 18 shows a generally schematic top plan view of a combined feed conveyor 23 and article rotator 24. The feed conveyor 23 preferably comprises a live roller conveyor in which the driven live rollers 25 are mounted on a skew, such that articles delivered to the conveyor from the cross conveyor 22 will be driven into a vertical side wall 26 which lies in the above described common vertical plane.

Figure 2:
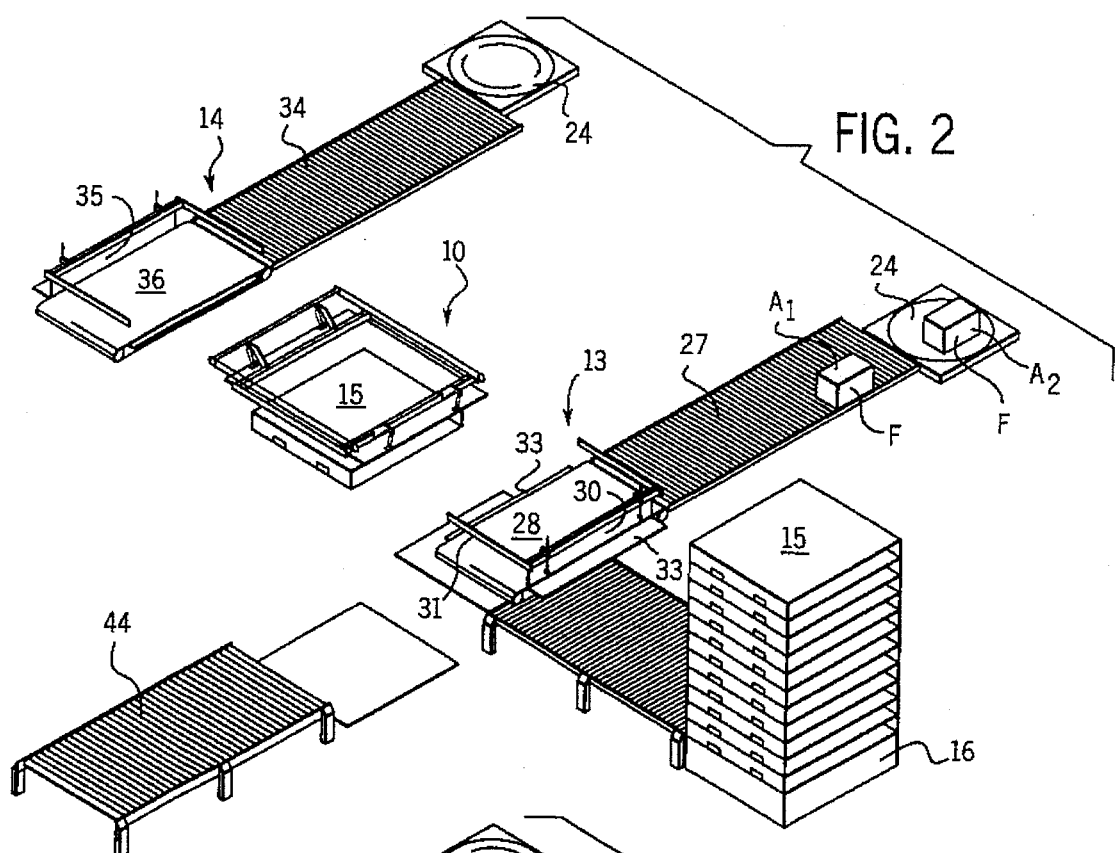
FIGS. 2–15 are somewhat simplified views of the system shown in FIG. 1 showing various stages of operation of the palletizing system.

In FIG. 2, the first article $A_1$ is shown moving along a first in-feed conveyor 27 of the first tier forming station 13. Article $A_1$ passes directly from the feed conveyor 23 onto the in-feed conveyor 27 without rotational reorientation by the article rotator 24. As shown, its outer face F remains oriented in the vertical plane defined by the side wall 26 of the feed conveyor 23. The next article $A_2$ is also shown moving through the article rotator 24 without rotational reorientation for transfer onto the first in-feed conveyor 27 in spaced relation to the preceding article $A_1$.

Figure 3:
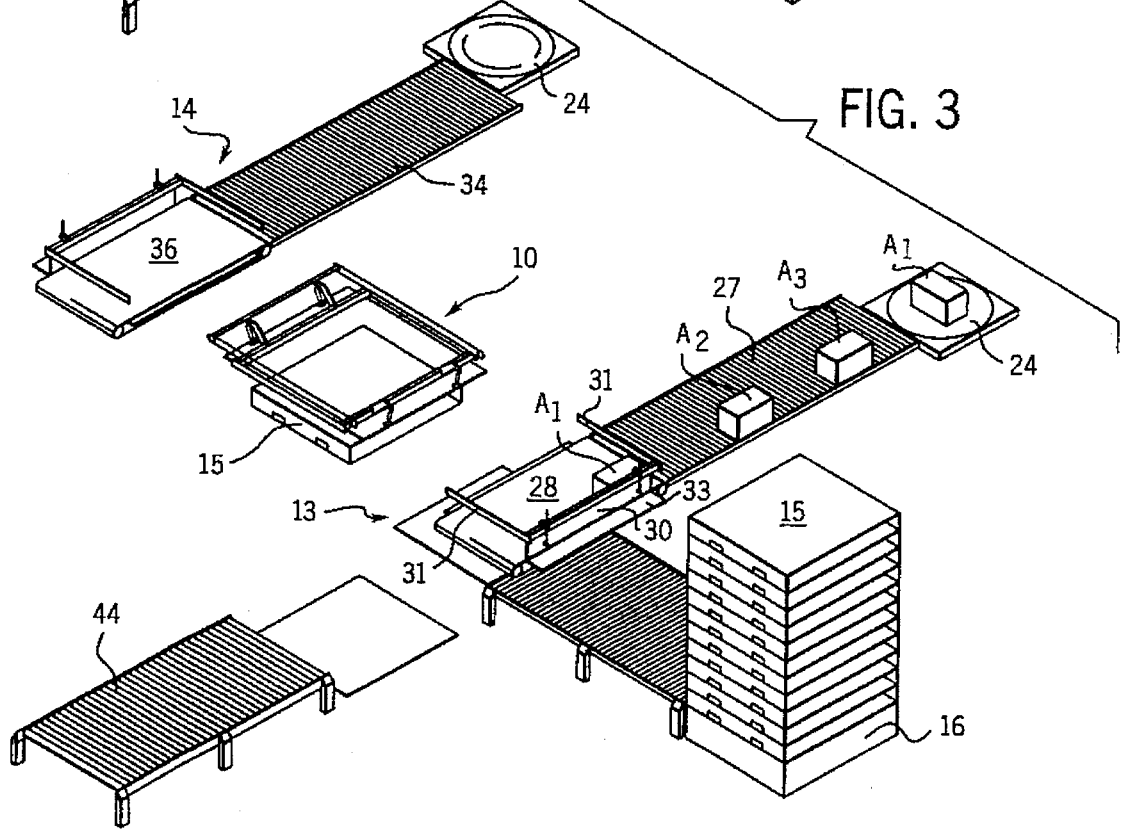

In FIG. 3, the lead article $A_1$ is shown immediately after transfer from the downstream end of the first in-feed conveyor 27 onto the upstream end of a tier station conveyor 28. The tier station conveyor 28 is a belt conveyor which is synchronized to be driven intermittently each time an article A reaches its upstream end. As shown, the first tier station conveyor 28 is operated just long enough to clear article $A_1$ from the in-feed conveyor 27 so that the article is stopped immediately after clearing the downstream end of the in-feed conveyor.

A laterally movable pusher plate 30 is positioned above the tier station conveyor 28 and, in its fully retracted position shown in FIG. 3, has a vertical plate surface positioned in the plane common to the lateral face F of article $A_1$. The ends of the pusher plate 30 are supported on carriage tracks 31 operable to drive the pusher plate laterally across the station conveyor 28 from its FIG. 3 position, as will be described hereinafter. In FIG. 3, the immediately following articles $A_2$ and $A_3$ are shown moving along the first in-feed conveyor 27. When article $A_2$ reaches the downstream end of the in-feed conveyor 27 to a position where it is in end-to-end abutment with article $A_1$, the tier station conveyor 28 is operated to carry articles $A_1$ and $A_2$ until the trailing article $A_2$ has cleared the in-feed conveyor 27. In the meantime, the in-feed conveyor 27 continues to operate and to carry article $A_3$ toward the first tier station conveyor 28.

Figure 4:
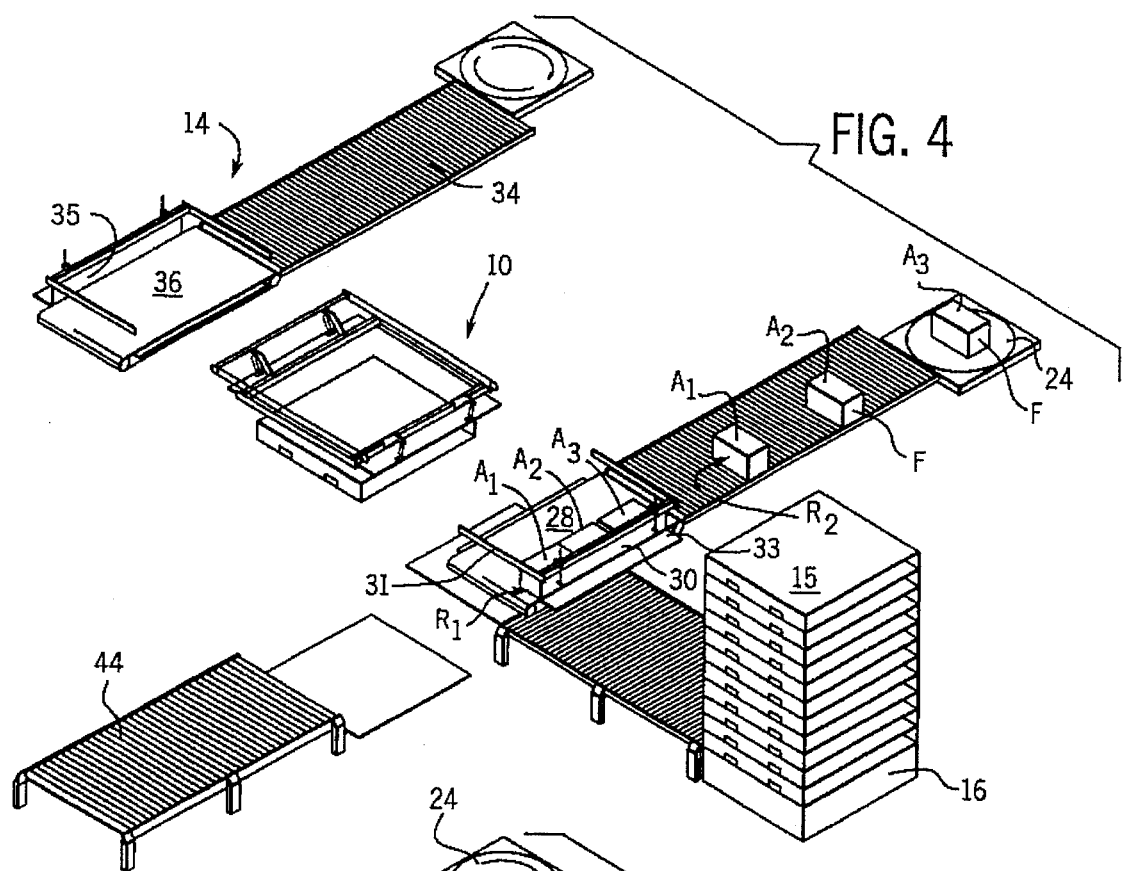

In FIG. 4, article $A_3$ is shown after it has been transferred onto the tier station conveyor 28 and, with preceding articles $A_1$ and $A_2$ forms a first row $R_1$ of articles. The outside faces F of each of the articles $A_1$–$A_3$ remain in the common vertical plane originally established by the side wall 26 of the initial feed conveyor 23, which is also coplanar with the face of the pusher plate 30. It will be noted in FIG. 4 that row $R_1$ includes a gap between articles $A_2$ and $A_3$. The gap is created to match the length of the row $R_1$ more closely to the length of the pallet 15 on which the row will eventually be deposited. The length of the gap or even the presence of a gap in a row at all depends on the length of the articles or the width of the articles (if they are reoriented) as will be described in greater detail hereinafter. Actual creation of the gap may be accomplished at the time article $A_2$ is transferred from the in-feed conveyor 27 to the tier station conveyor 28 or may be accomplished by activating the tier station 28 shortly before article $A_3$ reaches its upstream end.

With continued reference to FIG. 4, the articles $A_1$–$A_3$ forming part of the next row $R_2$ have been delivered from the supply conveyor system 21 and are moving toward the tier station conveyor 28. However, each of these articles A has been turned 90° on the article rotator 24 while the outside face F of each is maintained in the same common vertical plane as the faces F of the articles in the preceding row $R_1$ already formed. In this regard and referring again to FIG. 18, the article rotator 24 is constructed to rotate the articles A about a vertical axis 32 which is positioned to place the rotated face F of the article in the same vertical plane as the face of the article in contact with the side wall 26 prior to 90° rotation. The rotator 24 preferably includes means to clamp the article vertically during rotation to insure proper face alignment is maintained.

Figure 5:
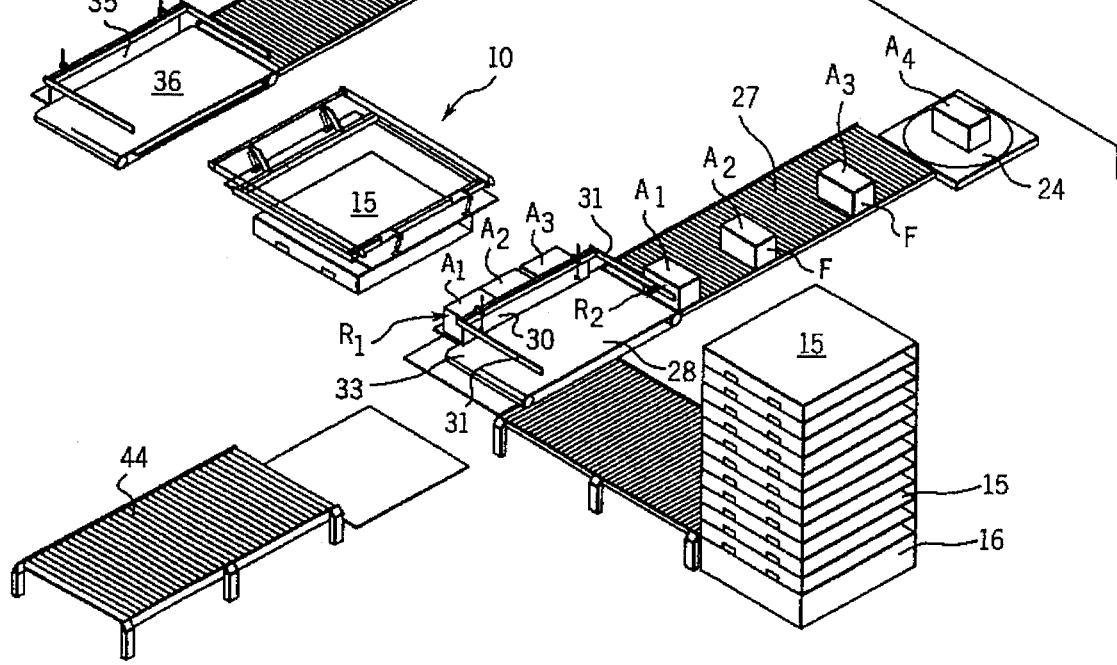

Before the lead article $A_1$ of the next row $R_2$ reaches the end of the in-feed conveyor 27, the pusher plate 30 is activated to move along its supporting carriage tracks 31 to push row $R_1$ laterally across the stationary surface of the first tier station conveyor 28 and onto the leading edge of a transfer sheet 33 which has simultaneously been extended outward from beneath the upper run of the tier station conveyor, as shown in FIG. 5. As soon as row $R_1$ is deposited on the transfer sheet 33, the pusher plate 30 is immediately raised vertically, withdrawn horizontally and lowered to its original position in the common vertical plane of the lateral faces F of the articles forming the next row $R_2$. Vertical raising and lowering of the pusher plate 30 is effected by air cylinders 29 or other suitable linear actuators.

Figure 6:
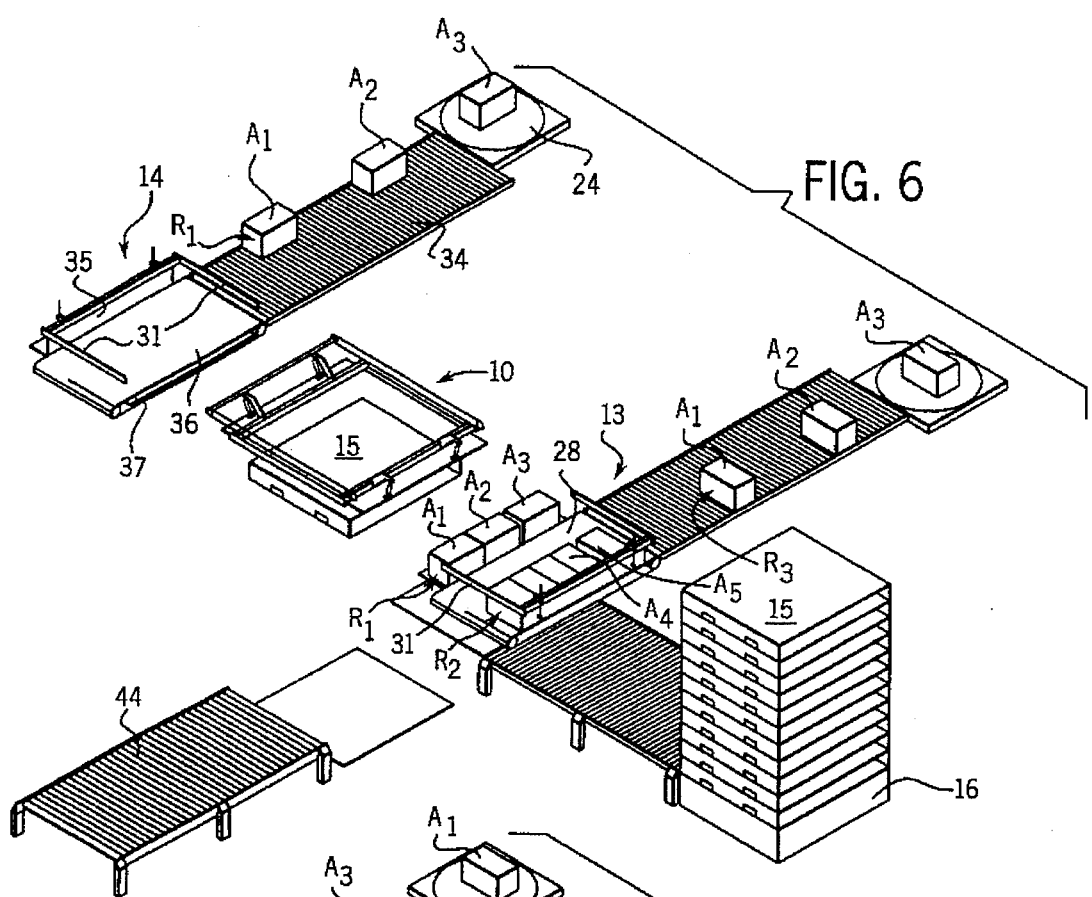

As shown in FIG. 6, row $R_2$ is formed on the first tier station conveyor 28 in generally the same manner as the preceding row $R_1$, but is comprised of five articles $A_1$–$A_5$ because the row $R_2$ is formed of articles which have been reoriented to align their narrow dimension by 90° rotation on the upstream article rotator 24. Row $R_2$ is also formed with a gap between the last two articles $A_4$ and $A_5$, but the gap is slightly smaller and offset in the upstream direction with respect to the direction of row formation from the gap formed in row $R_1$.

Figure 7:
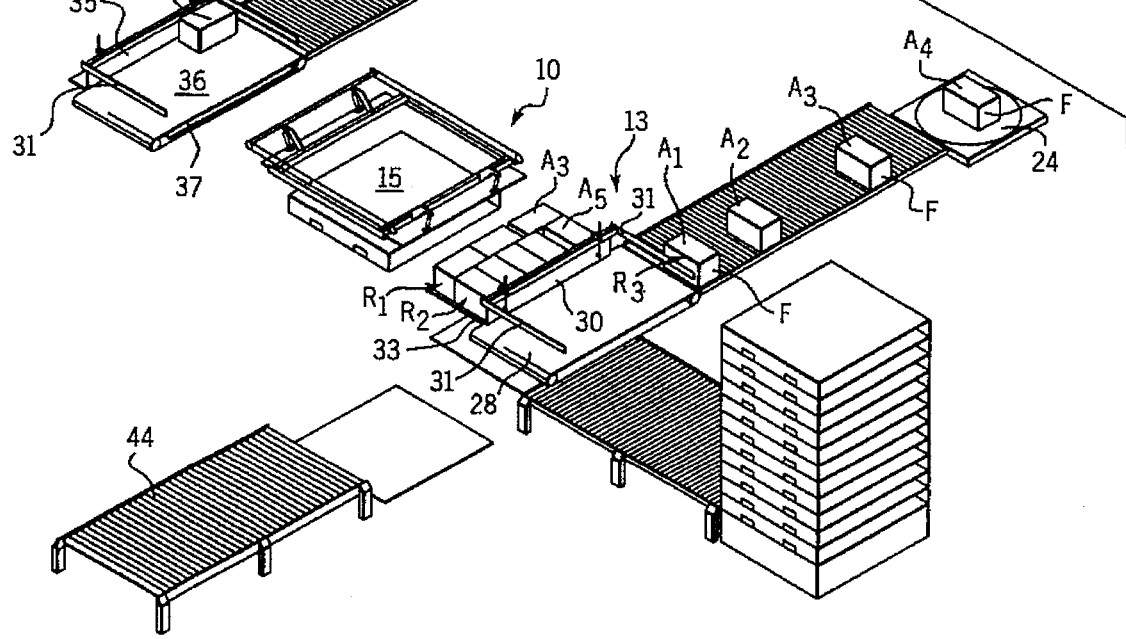

As row $R_2$ is being formed in the first tier forming station 13, a first row $R_1$ is also being formed in the second tier forming station 14 on the opposite side of the stacking station 10. The articles $A_1$–$A_3$ destined to form row $R_1$ in the second tier forming station 14 travel from the feed conveyor 23 onto a second in-feed conveyor 34 in exactly the same manner previously described for row $R_1$ in the first tier forming station 13. Thus, the articles $A_1$–$A_3$ travel along the second in-feed conveyor 34 with their lateral outer faces (not visible in FIG. 6) in a common vertical plane which is coplanar with the face of the second pusher plate 35 located above the second tier station conveyor 36. Also, the formation of a third row $R_3$ is progressing along the first in-feed conveyor 27 and, referring also to FIG. 7, before the first article $A_1$ of new row $R_3$ reaches the downstream end of in-feed conveyor 27, preceding row $R_2$ is moved laterally across tier station conveyor 28 and onto the transfer sheet 33 which has also been indexed toward the stacking station 10 by a distance sufficient to accommodate the width of row $R_2$. After transfer of row $R_2$, the pusher plate 30 is immediately raised, retracted and lowered to its initial position in the vertical plane of the faces F of the articles which will form row $R_3$.

Figure 8:
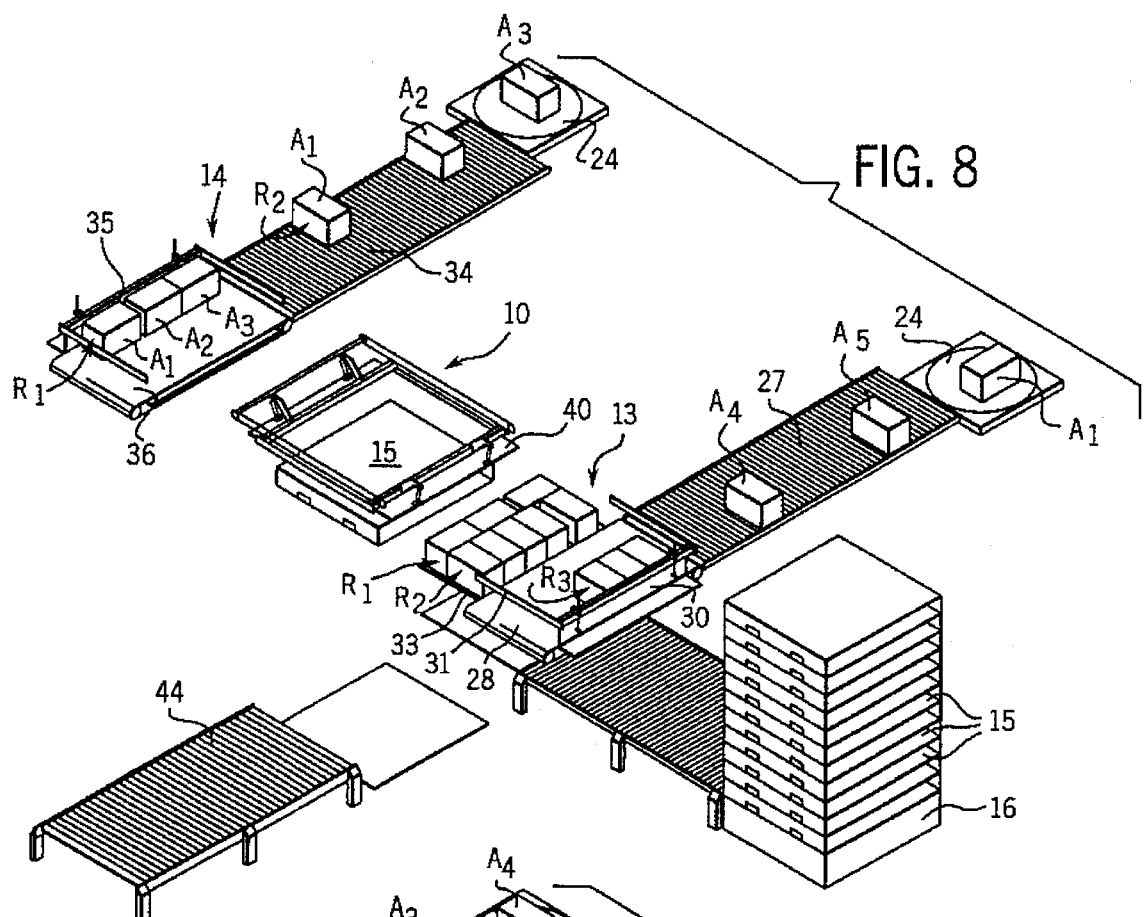
Figure 9:
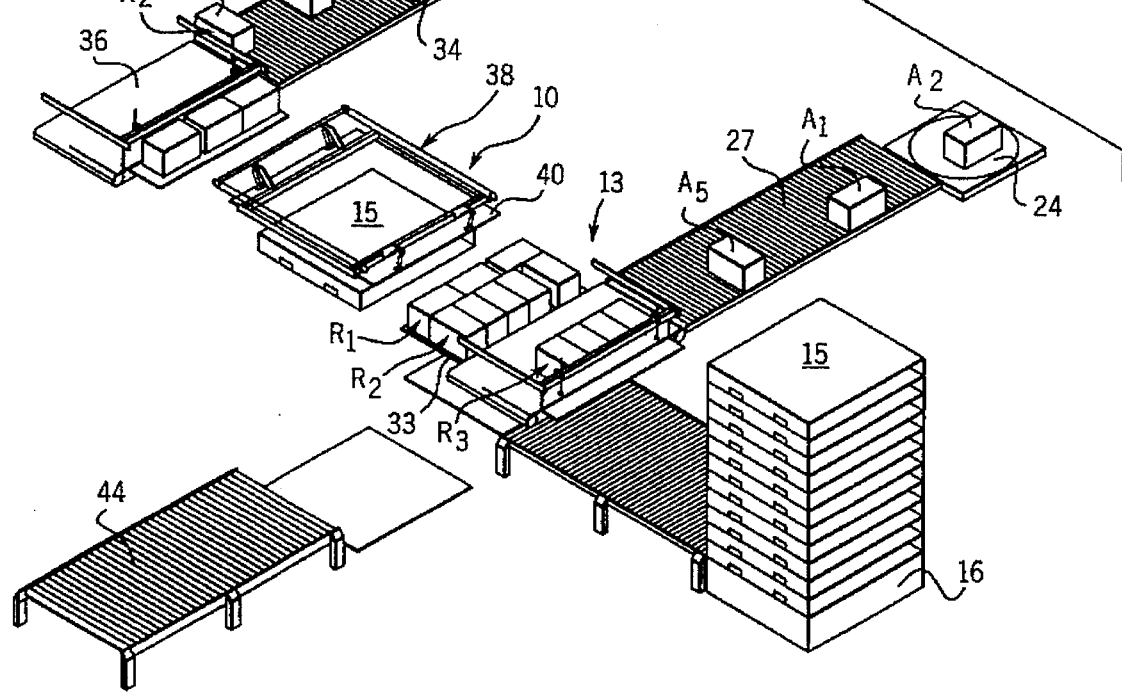

In FIG. 8, row $R_1$ comprising articles $A_1$–$A_3$ has been completed in the second tier forming station 14, while row $R_3$ is being completed in the first tier forming station 13 in a form identical to preceding row $R_2$. It will be noted that row $R_1$ formed on the second tier station conveyor 36 is slightly different than the corresponding row $R_1$ formed on the first tier station conveyor 28. The difference is that the gap is formed between the first two articles $A_1$ and $A_2$, rather than between the second and third articles as in row $R_1$ in the first tier forming station 13. As soon as row $R_1$ is completed on the second tier station conveyor 36, pusher plate 35 is activated to transfer the row across the conveyor and onto the second transfer sheet 37 which has been indexed outwardly from under the conveyor 36, simultaneously with movement of the pusher plate 35, a distance sufficient to accommodate row $R_1$. The transfer of row $R_1$ is shown in FIG. 9. Immediately after deposit of the row onto the transfer sheet 37, the pusher plate 35 is raised, retracted and lowered to its initial row forming position. FIG. 9 also shows the last article $A_5$ moving along the first in-feed conveyor 27 to complete row $R_3$. Meanwhile, the movement of the lead articles $A_1$–$A_3$ for row $R_2$ continues on the opposite second in-feed conveyor 34.

Figure 10:
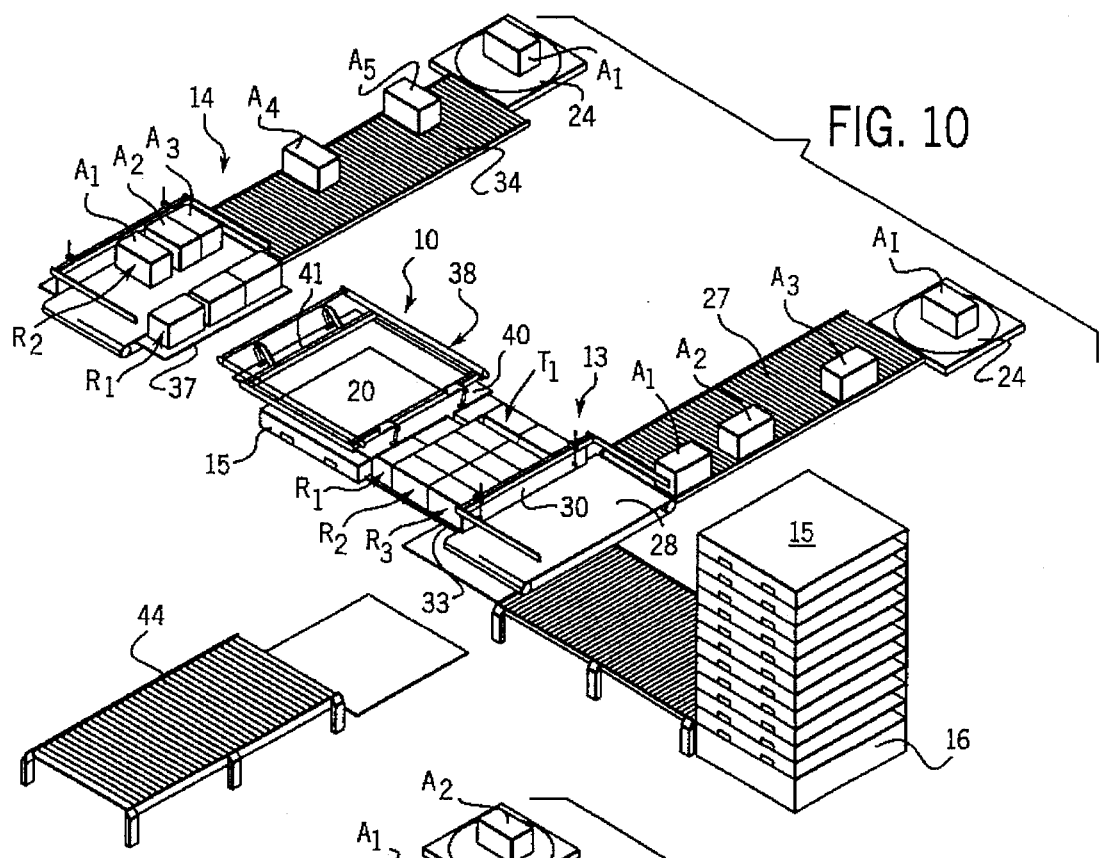
Figure 11:
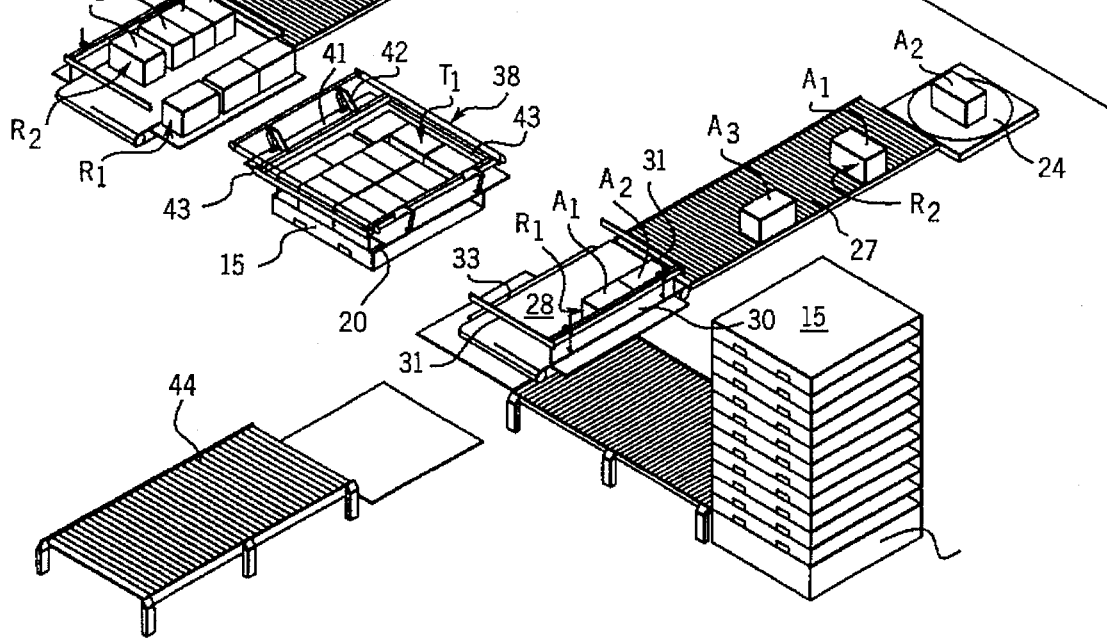
Figure 12:
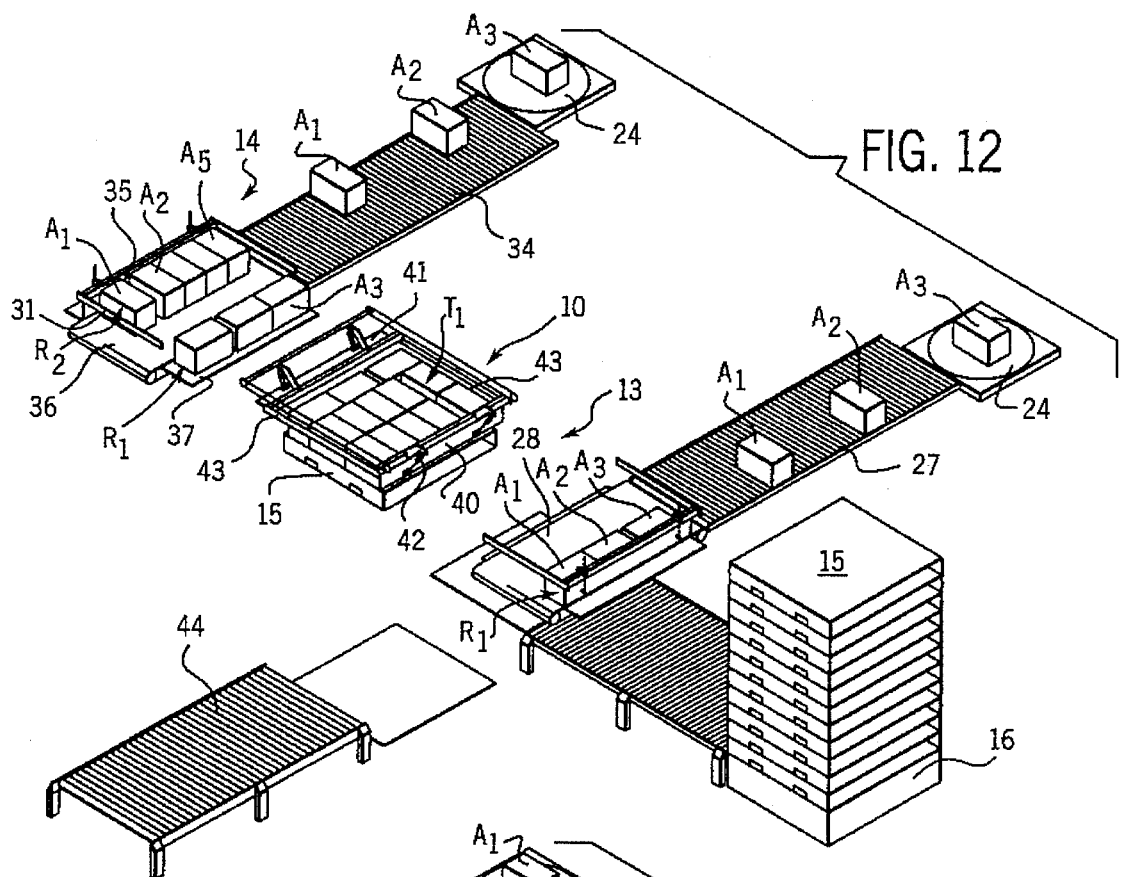

Referring once again to the first tier forming station 13 and continuing on to FIG. 10, the transfer sheet 33 has been again indexed laterally by a distance equal to the width of row $R_3$, which row has been transferred by pusher plate 30 onto the transfer sheet and into side-to-side abutment with row $R_2$. The three rows $R_1$–$R_3$ form tier $T_1$ on the transfer sheet 33. Transfer sheet 33, carrying the completed tier $T_1$ is then moved laterally into the stacking station 10 over the top of the pallet 15 positioned therein. The top of the pallet and any tie sheet 20 placed thereon are positioned vertically so that the transfer sheet 33 just clears the upper surface. A tier scraper and squaring mechanism 38 is positioned directly above the stacking station 10 and includes first and second scraper plates 40 and 41, each of which is mounted to pivot about a horizontal axis between an upper horizontal inoperative position (shown in FIGS. 10 and 11) and a lower vertical operative position shown in FIG. 12. Each of the scraper plates 40 and 41 may conveniently be rotated between the upper horizontal inoperative position, allowing the transfer sheet 33 and tier $T_1$ to be moved from the FIG. 10 position, under the first scraper plate 40, and into the FIG. 11 position over the pallet 15 in the stacking station. With the tier $T_1$ supported in the stacking station on the transfer sheet 33, fluid cylinders 42 operatively attached to the scraper plates 40 and 41 are extended to cause the plates to pivot downwardly to their vertical operative positions and into engagement with the respective opposite end faces of the tier $T_1$ of articles, as shown in FIG. 12. A pair of side tamps 43 are suspended from the scraper and squaring mechanism 38, one adjacent each side face of the tier $T_1$. The side tamps are operable similarly to the scraper plates 40 and 41 so that they may be rotated downwardly into a vertically disposed operative position (shown in FIGS. 11 and 12) into engagement with the side faces of the tier $T_1$. Thus, the combined operative positioning of the scraper plate pair 40 and 41 and the side tamp pair 43 effects a squaring of the tier on the transfer sheet 33. The transfer sheet is then withdrawn fully from beneath the tier of articles, returned to its position below the first tier station conveyor 28, while the face of the first scraper plate 40 engages the end face of the tier formed by the articles in row $R_3$ thereby permitting the entire tier $T_1$ to be held against horizontal movement. The tier is thus deposited directly on the pallet 15 (or tie sheet 20, if present).

Figure 16:
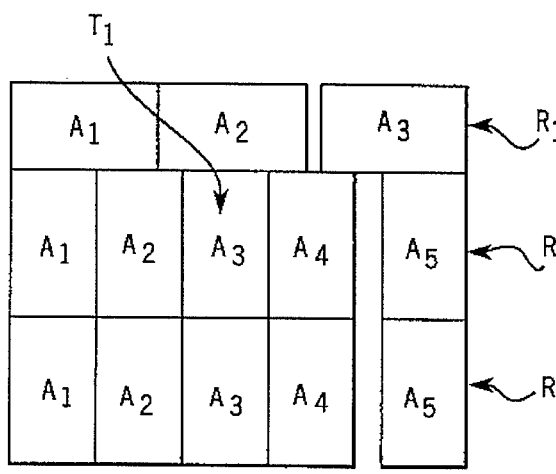
FIGS. 16 and 17 are top plan views of vertically adjacent superimposed stacked tiers of articles showing alternate stacking arrangements.
Figure 17:
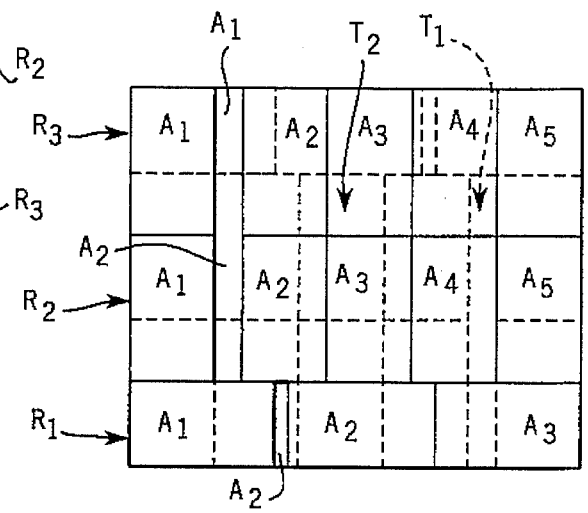

While tier $T_1$ from the first tier forming station is being deposited in the stacking station, row $R_2$ has been formed on the tier station conveyor 36 in the second tier forming station 14, as shown in FIG. 12. Row $R_2$ is then transferred laterally onto the outwardly indexed second transfer sheet 37 by lateral movement of the second pusher plate 35. In the meantime, the articles which will form row $R_3$ and complete the formation of tier $T_2$ in the second tier forming station 14 are moving through the supply conveyor system 21 and onto the second in-feed conveyor 34. Rows $R_2$ and $R_3$ are identical to one another, but each is formed of articles which have been reoriented by 90° rotation with respect to the articles forming row $R_1$. Thus, rows $R_2$ and $R_3$ for tier $T_2$ are nearly identical to the corresponding rows formed for the first tier $T_1$ except, as may be seen in FIGS. 12 and 13, rows $R_2$ and $R_3$ in tier $T_2$ are formed with the gaps between the first two articles $A_1$ and $A_2$, rather than the last two, as in tier $T_1$. As previously described, row $R_1$ of tier $T_2$ was also formed with the gap at the opposite end as compared to the corresponding row from tier $T_1$. Comparing tiers $T_1$ and $T_2$ in top plan view, as seen for example in FIG. 13, it will be seen that the tiers are identical except for relative rotation 180° with respect to one another about a vertical axis. As a result, and as shown in FIGS. 16 and 17, there is no overlap in any gaps in tier $T_1$ with the gaps in tier $T_2$ when the latter is deposited atop the former in the stacking station. Each of the tiers is horizontally asymmetric, in both the lateral and longitudinal direction, because of the particular size and shape of the articles A. However, palletizing articles of a different size and/or shape could result in tiers of unidirectional asymmetry or even complete symmetry.

On the other side of the system in FIG. 12, in the first tier forming station 13, the first row $R_1$ of tier $T_3$ has been formed and is ready for lateral transfer onto the first transfer sheet 33 in the same manner previously described for the first row of tier $T_1$.

Figure 13:
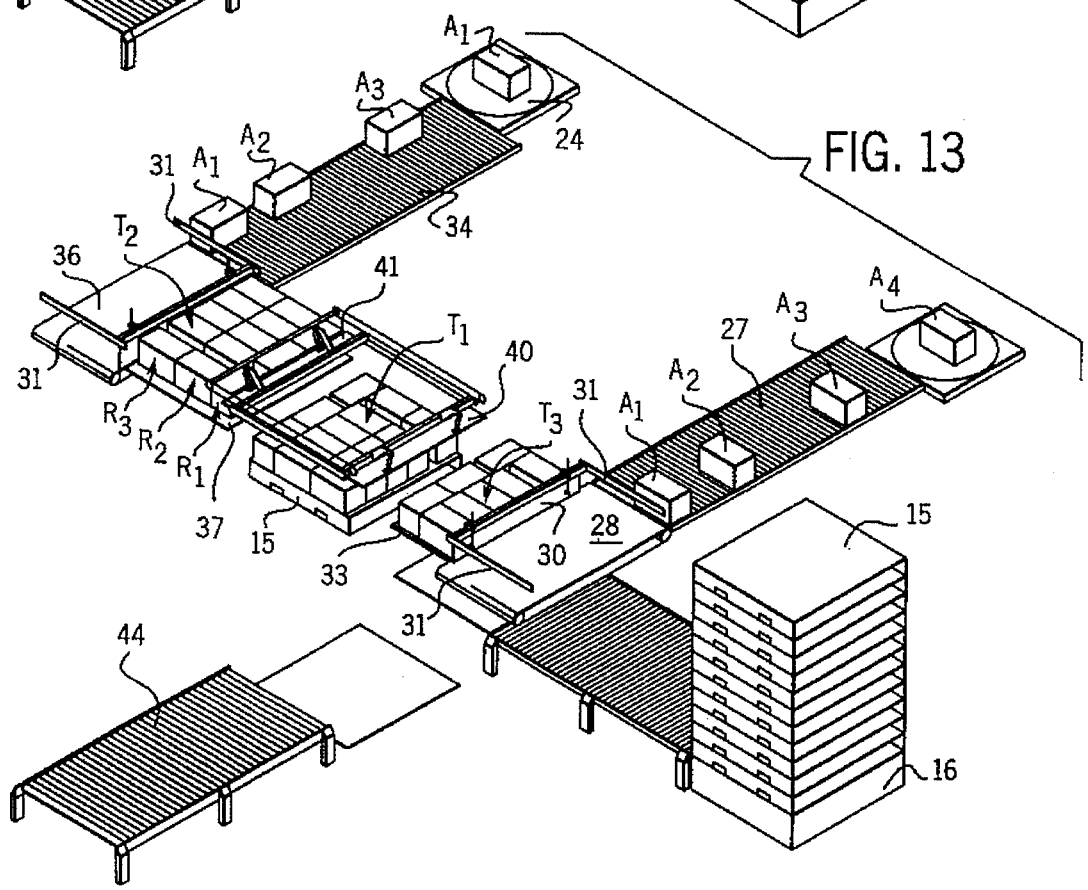
Figure 14:
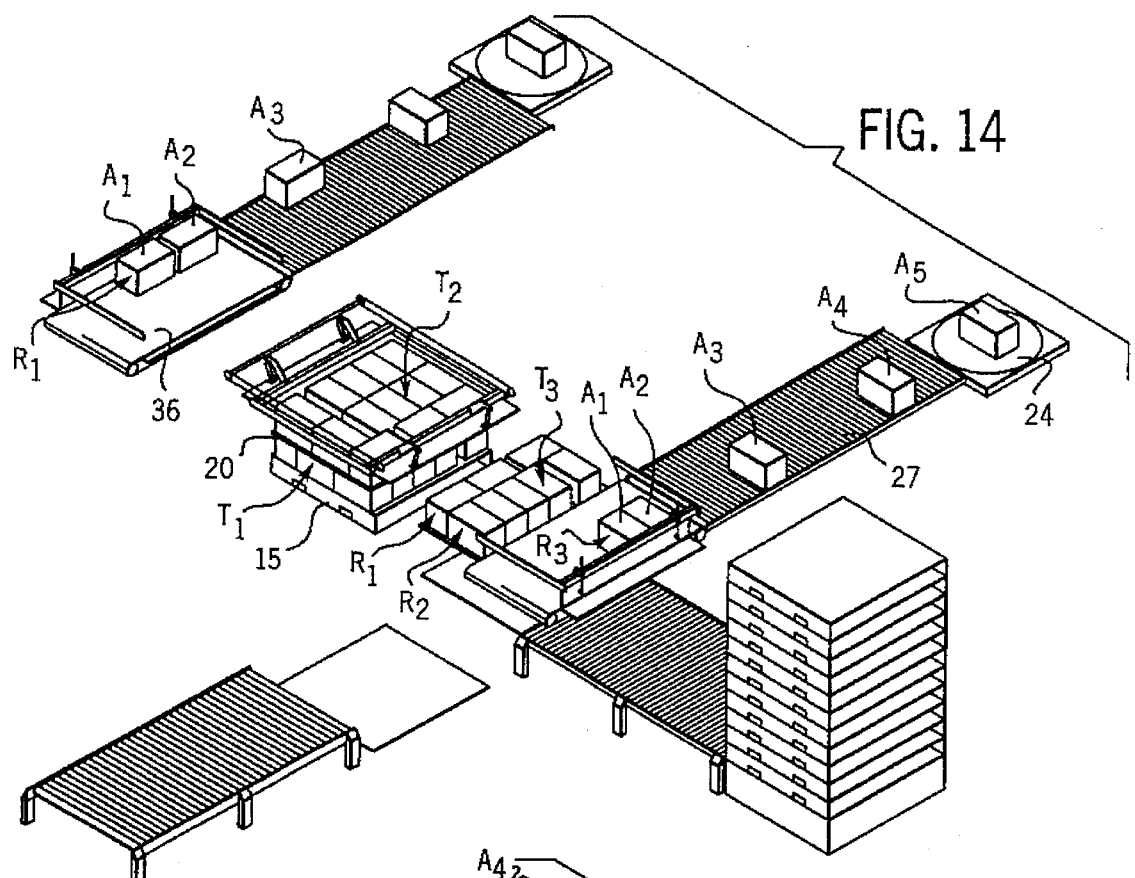

Referring also to FIG. 14, tier $T_2$ formed on the second transfer sheet 37 (as best shown in FIG. 13) is transferred into the stacking station on the transfer sheet in the same manner previously described with respect to tier $T_1$ and transfer sheet 33. However, prior to actual transfer into the stacking station, the pallet supporting platform 11 (FIG. 1) is indexed downwardly a distance equal to the height of the transfer sheet and one tier. Also, the tie sheet feeder 17 (FIG.

1) may be operated to place a tie sheet 20 on top of tier $T_1$ to provide a separation between it and tier $T_2$ as is common in the prior art. It should also be pointed out that the gaps formed between articles in each of the rows results in tiers which have areas that correspond generally to the area of the pallet 15 and are shaped so that their perimeters substantially correspond to the pallet perimeter. The result is an overall rectangular prismatic shape to the entire palletized load which enhances load wrapping or banding, as well as transfer, shipping and storage.

Figure 15:
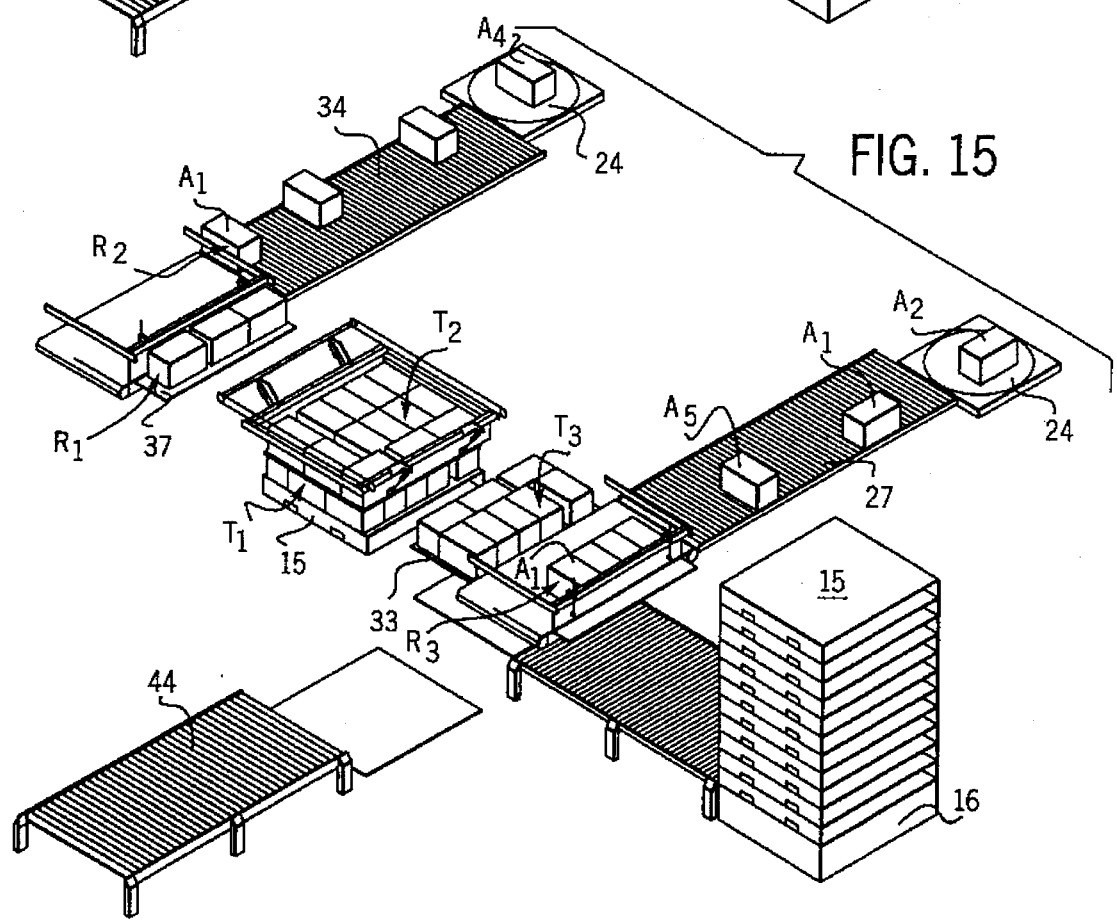

If the palletized load is to comprise three tiers, the third tier $T_3$ which is in the process of being formed in the first tier forming station 13 by the addition of the final row $R_3$ (FIG. 15), is transferred into the stacking station 10 and deposited atop the tie sheet 20 and tier $T_2$ in the same manner previously described. Subsequent tiers in both tier forming stations 13 and 14 may be continued to be formed as described, whether intended for the stack $S_1$ presently being formed in the stacking station or a subsequently formed new stack. Referring again to FIG. 1, the completed stack which has been incrementally lowered by the pallet supporting platform 11 during formation, is finally lowered to position the supporting pallet 15 in the same horizontal plane as a stack discharge conveyor 44 which is operative to carry the palletized stack from the system. Another pallet 15 for the subsequent stack is supplied from the pallet feeder 16 to the pallet supporting platform 11 in the stacking station and raised vertically to a level for receipt of the first new tier $T_1$, with a tie sheet being placed thereon as desired.

The system of the present invention provides a significant increase in the overall palletizing speed because it is not necessary to halt or delay row, tier or stack formation to await the return of reciprocating transfer mechanisms. Another advantage of continuous formation of tiers from two opposite sides of the stacking station is that the control program can utilize nearly identical routines to form alternate mirror image tiers in the tier forming stations 13 and 14. As indicated previously, the tiers $T_1$ and $T_2$, whose formation has been described with respect to the described embodiment, are not true mirror images of one another, but are rather formed identically but relatively rotated 180° about a vertical axis. In the particular arrangement of articles A used to form these tiers, better stack stability is attained by utilizing a modified mirror image tier formation as previously described and shown in FIG. 16. Referring to FIG. 17, a true mirror image formation of vertically adjacent tiers would result in an overlap in gaps between adjacent tiers and the possibility of a substantial lack of support for certain articles in the upper tier. This formation of overlapping gaps would become aggravated if subsequent tiers were similarly formed, resulting in potential instability of the entire stack and stack imbalance as well. Of course, article size and shape may vary considerably from one order to another, but the system is widely adaptable to program the row, tier and stack formation subroutines in a manner which accommodates the formation of tiers which conform to the pallets and provide gaps within the tiers which are distributed to avoid or minimize instability.

An alternate and presently preferred embodiment for the portion of the system utilized to form rows R of articles A is shown in FIGS. 19–23. In this embodiment, the system is operationally identical to the embodiment previously described, except that the first and second in-feed conveyors 27 and 34, respectively, are each formed of a plurality of conveyor segments and each row R is fully formed on the in-feed conveyor and transferred as a unit onto the respective tier station conveyor 28 or 36. The construction and operation of the modified first in-feed conveyor 27 will be described with respect to the initial formation of the first two rows $R_1$ and $R_2$, it being understood that the modified second in-feed conveyor 34 operates identically and the rows once transferred onto the tier station conveyors are further processed in a manner identical to the system previously described.

Figure 19:
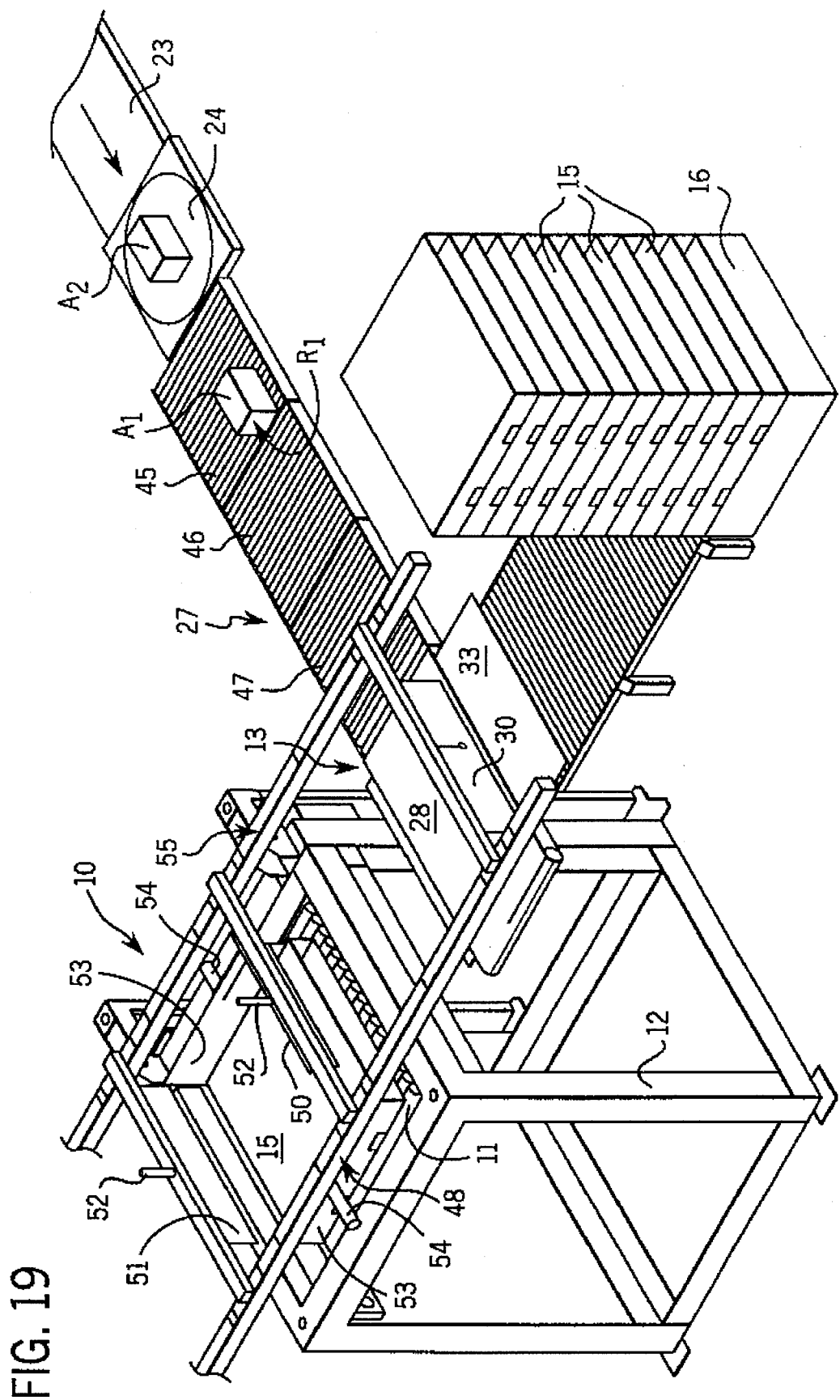
FIGS. 19–24 are perspective views of the presently preferred embodiment of the system showing various stages of operation.
Figure 20:
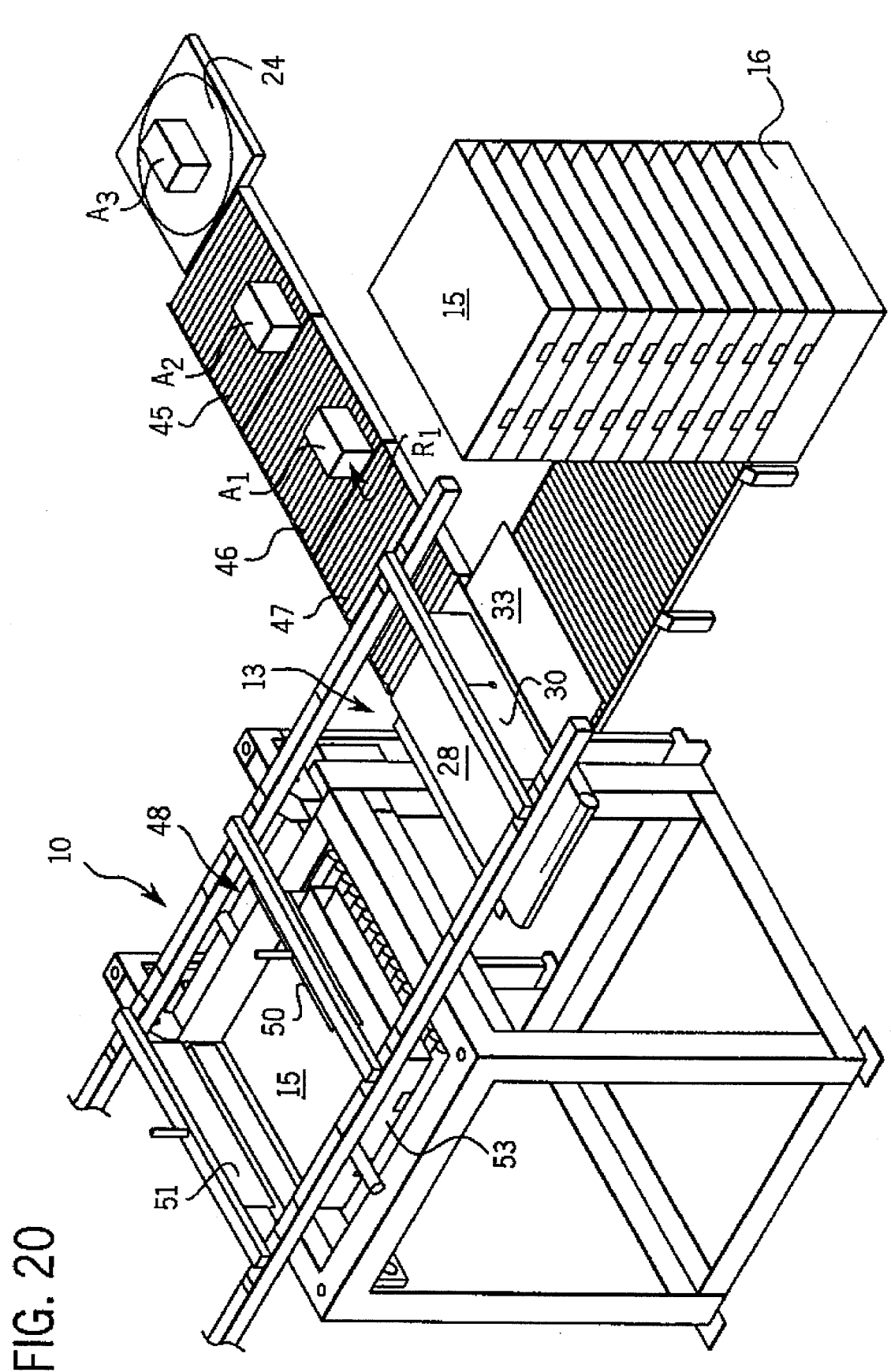

Referring to FIG. 19, the first in-feed conveyor 27 is comprised of three serially aligned, but independently operable, conveyors including an upstream take-up conveyor 45, an intermediate take-up conveyor 46, and a downstream accumulation conveyor 47. The three conveyors 45–47 are independently operated at the same speed, but independently controlled and coordinated to form a row in its final orientation on the accumulation conveyor 47 from which it is transferred as a completed unit onto the first tier station conveyor 28.

Figure 21:
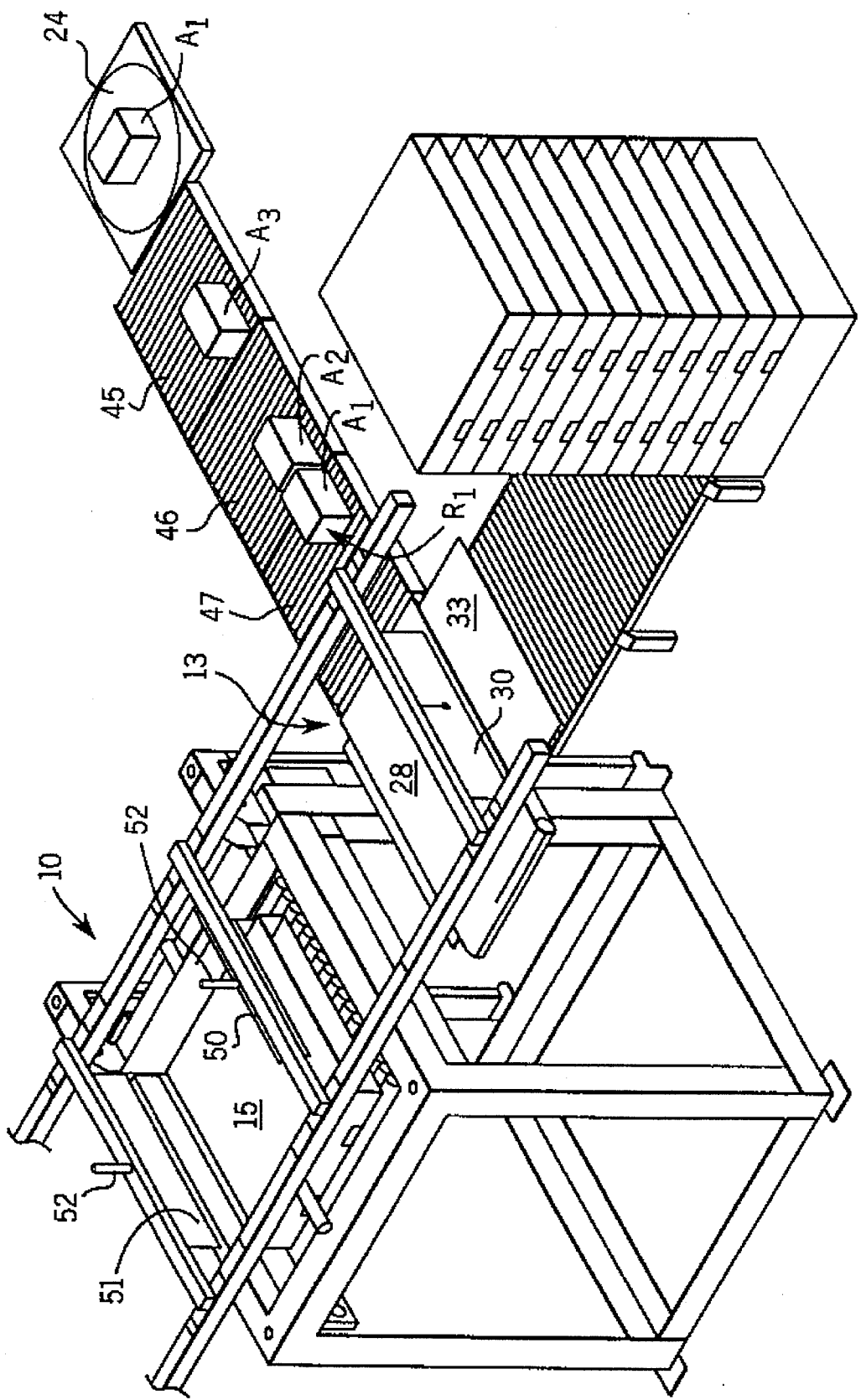
Figure 22:
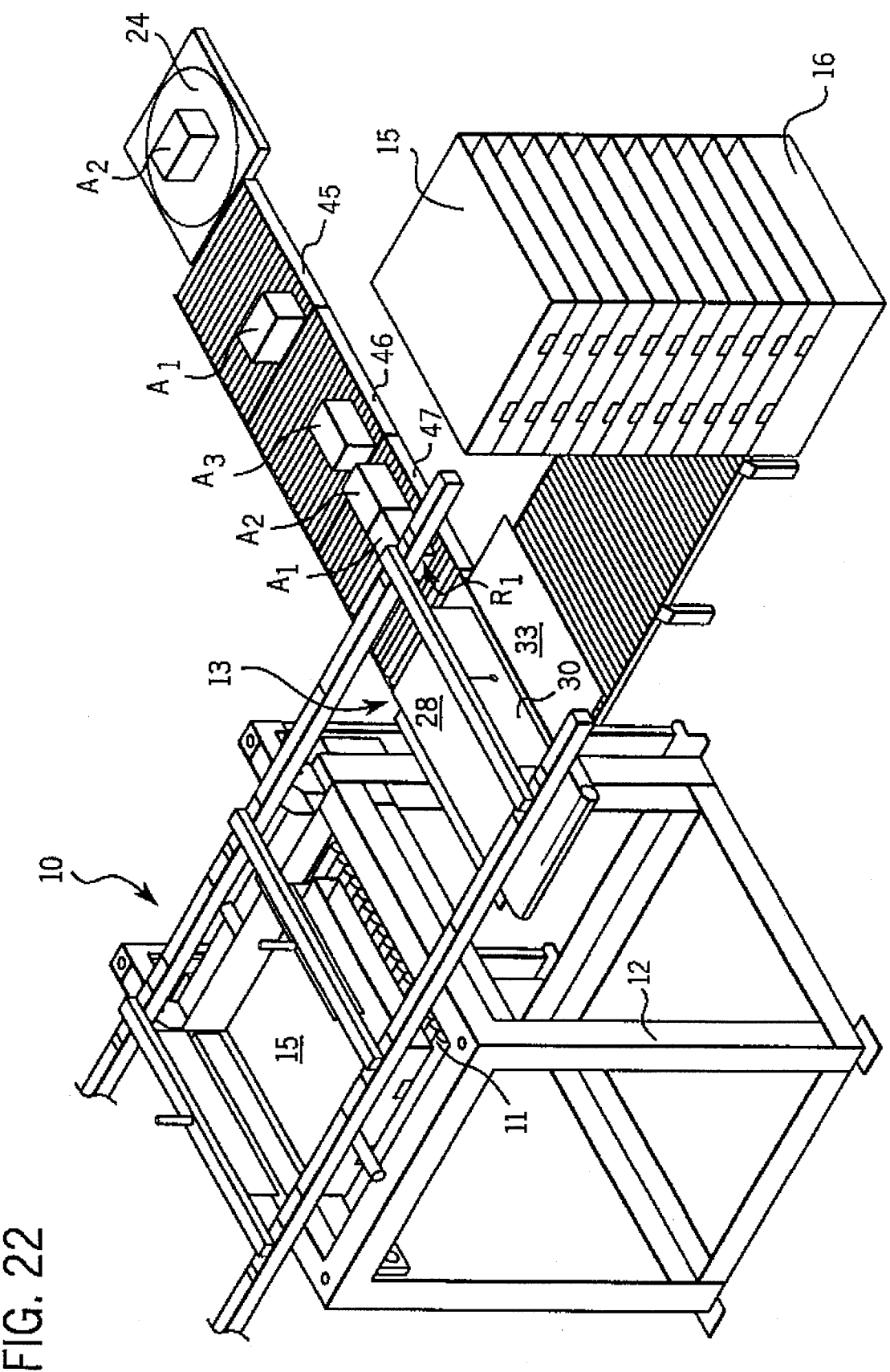
Figure 23:
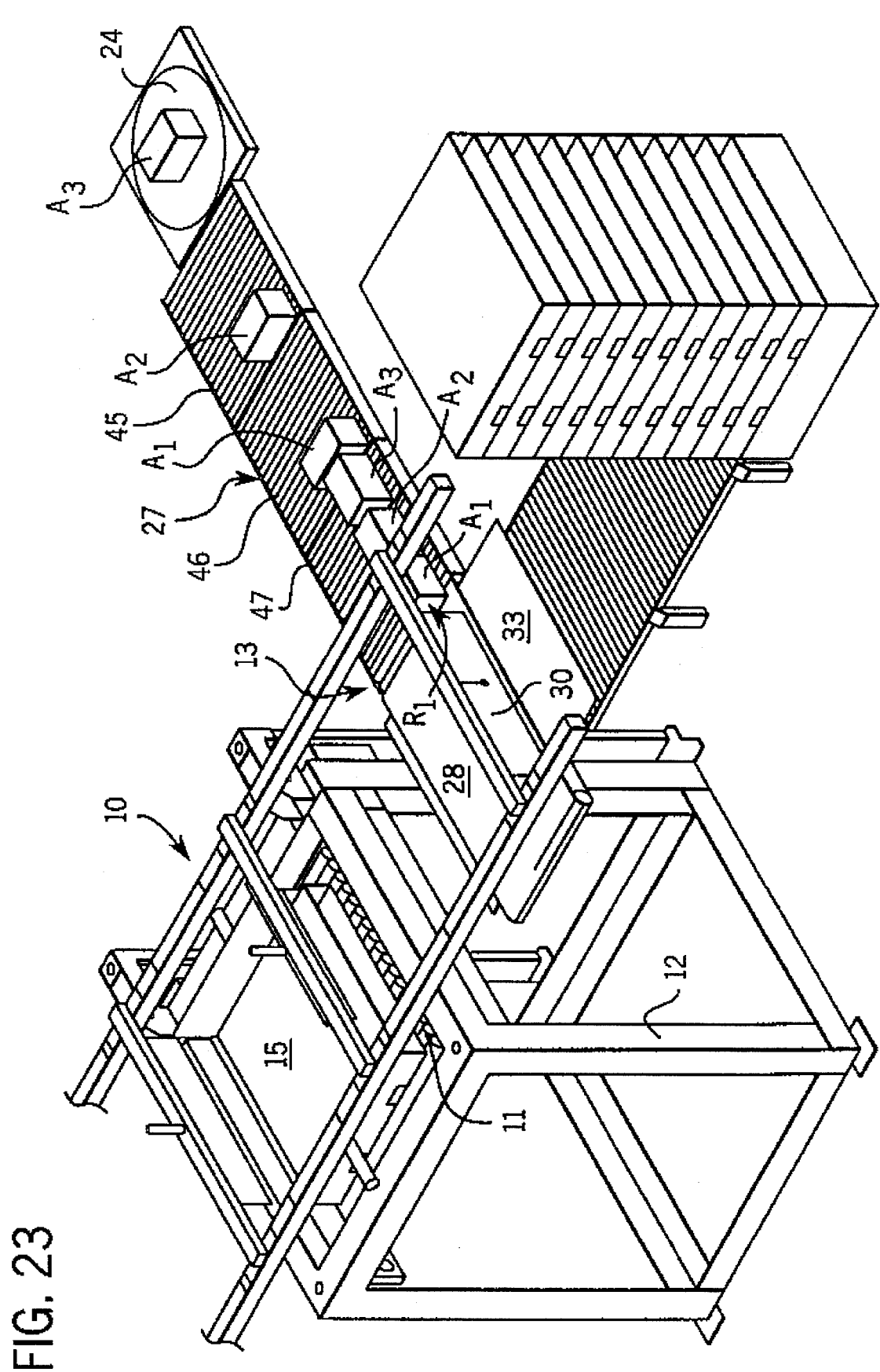

A first article $A_1$ is moved onto the upstream take-up conveyor 45 from the feed conveyor 23. As article $A_1$ reaches the downstream end of the upstream take-up conveyor, article $A_2$ is transferred from the feed conveyor 23 in the same manner. Then, with all three conveyors 45, 46 and 47 operating, articles $A_1$ and $A_2$ are moved downstream and succeeding article $A_3$ is fed onto the upstream take-up conveyor 45 as the preceding articles $A_1$ and $A_2$ reach the respective ends of the intermediate conveyor 46 and upstream conveyor 45. Continued operation of the three in-feed conveyors causes lead article $A_1$ to move onto the upstream end of the accumulation conveyor 47 and, when it is completely onto that conveyor (FIG. 21), conveyor 47 is momentarily halted while the trailing articles $A_2$ and $A_3$ move together in constant spaced relation until they reach the downstream ends of their respective conveyors 46 and 45, as also shown in FIG. 21. At this point, accumulation conveyor 47 is re-started to run with the already operating take-up conveyors 46 and 45 so that lead articles $A_1$ and $A_2$ move together onto and along conveyor 47, while trailing article $A_3$ moves onto the intermediate take-up conveyor 46. Simultaneously, the lead article $A_1$ for the second row $R_2$ is fed onto the upstream take-up conveyor 45, after having first been turned 90° in the article rotator 24. All three in-feed conveyors continue to operate until the lead articles $A_1$ and $A_2$ of the first row $R_1$ are fully onto the cumulation conveyor 47 and the trailing face of article $A_2$ is spaced from the upstream end of conveyor 47 by a distance equal to the gap which is desired to be formed between articles $A_2$ and $A_3$ in the same manner as the previously described embodiment and shown in FIG. 4. At this point, the accumulation conveyor is temporarily halted and take-up conveyors 45 and 44 continue to operate until articles $A_3$ and trailing article $A_1$ of row $R_2$ reach the downstream ends of their respective conveyors 46 and 45. At this point, accumulation conveyor 47 is re-started and article $A_3$ moves onto it with the gap between it and article $A_2$ being maintained as shown in FIG. 23. With the re-start of accumulation conveyor 47 in FIG. 22, the second article $A_2$ of new row $R_2$ is also fed onto the upstream take-up conveyor 45.

Figure 24:
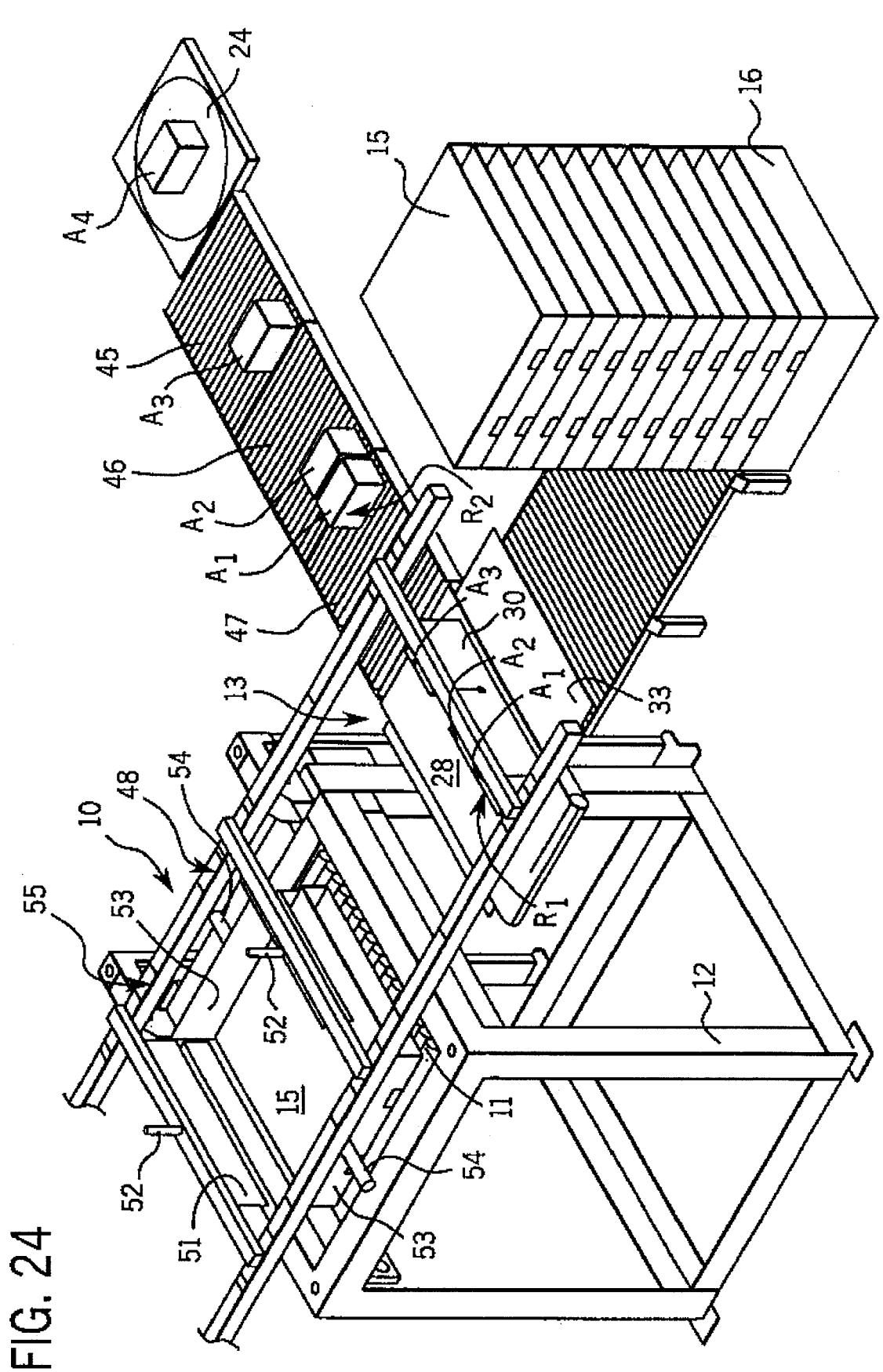

With row $R_1$ appropriately formed and supported only on accumulation conveyor 47, that conveyor can be operated independently of the take-up conveyors 45 and 46 to move row $R_1$ onto the first tier station conveyor 28, as shown in FIG. 24. As soon as row $R_1$ has been cleared from the accumulation conveyor 47, article $A_1$ of new row $R_2$ can be moved from the downstream end of take-up conveyor 46 (FIG. 23) to the upstream end of accumulation conveyor 47 (FIG. 24) at which point conveyor 47 is temporarily halted until following article $A_2$ reaches the position shown in FIG.

24. Row R₂ is completed in generally the same manner as described for preceding row R₁, except of course for its inclusion of a larger number of articles.

Each row transferred onto the tier station conveyor 28 is, in turn, moved laterally onto the transfer sheet in a manner identical to the preceding embodiment. In the same manner, each tier T is formed by incremental row transfer onto the transfer sheet and, when completed, the tier is moved into the stacking station 10, as previously described. Thus, the only basic difference between the system of FIGS. 19–24 and the preceding embodiment is the formation of individual rows on the accumulation conveyor 47 rather than on the tier station conveyor. Thus, the basic feature of the apparatus and method of the present invention remains unchanged, namely, forming a stack from tiers which are formed in two separate tier forming stations and transferred alternately to form the stack.

The construction of the apparatus shown in FIGS. 19–24 includes a few additional features which are changed from those described in the first embodiment. These changes relate entirely to the modified tier squaring and scraper mechanism 48, as compared to the corresponding mechanism 38 of the first embodiment. The first and second scraper plates 50 and 51 are each operated by a vertically oriented fluid cylinder 52 so that the plates raise and lower in a fixed vertical plane. The side tamps 53 are also each operable by a side tamp cylinder 54 to move linearly in and out to effect lateral squaring of the tier. Thus, the functions of the scraper plates 50,51 and the side tamps 53 remain identical to the functions in the previously described embodiment, but their actuation is linear rather than rotational. This last described embodiment also shows the positioning and extent of a common superstructure 55 which carries the pusher plates for both tier forming stations, and both pairs of scraper plates and side tamps.

Various modes of carrying out the present invention are contemplated as being within the scope of the following claims particularly pointing out and distinctly claiming the subject matter which is regarded as the invention.

We claim:

1. A system for forming a vertical stack of multiple tiers of articles, each tier in turn formed of a plurality of rows of the articles, said system comprising:

a stack forming station in which tiers are sequentially deposited;

a first tier forming station in which first tiers of articles are formed;

a first conveyor system on which articles are arranged in a row and the row positioned in the first tier forming station;

said first tier forming station including a first transfer sheet adjacent a lateral edge of said first conveyor system and onto which individual rows sequentially positioned in said first tier forming station are sequentially moved;

means for incrementally indexing said first transfer sheet away from the lateral edge of said first conveyor system in a direction transverse to the row positioned in said first tier forming station by a distance equal to the width of said row;

means for sequentially moving individual rows onto the transfer sheet to form a first tier; and, means for moving the transfer sheet into the stack forming station to deposit the tier therein.

2. The system as set forth in claim 1 including:

a second tier forming station and a second conveyor system, said second tier forming station having a second transfer sheet and being operative to form a second tier; and, said transfer sheet moving means being operative to alternately move said first and second transfer sheets into said stack forming station and to deposit said first and second tiers alternately atop one another.

3. The system as set forth in claim 1 wherein said articles are rectangularly prismatic and said stack forming station includes means for supplying stack-supporting pallets upon which the first tier and subsequently formed tiers are deposited to form the vertical stack, each of said pallets having a rectangular supporting surface of a given length and width; and, said first conveyor system including means for individually orienting and positioning articles forming each row so that each row has a length substantially equal to the length of the pallet surface and the total width of the rows in the tier is substantially equal to the width of said pallet surface, whereby the perimeter of the tier substantially corresponds to the perimeter of said surface.

4. The system as set forth in claim 3 wherein said means for orienting the articles comprises an article rotator upstream of the tier forming station.

5. The system as set forth in claim 3 wherein said means for positioning the articles comprises conveyor system control means for selectively forming gaps between articles in a row.

6. A system for forming a vertical stack of multiple tiers of articles, each tier in turn formed of a plurality of rows of the articles, said system comprising:

a stack forming station in which tiers are sequentially deposited;

first and second tier forming stations in each of which individual rows sequentially positioned therein are formed into respective first and second tiers, each tier forming station including an indexing transfer sheet movable transversely to a row by an incremental distance equal to the width of the row and means responsive to indexing movement of the sheet for moving individual rows sequentially onto the sheet to form a tier;

means for alternately moving the first and second transfer sheets into the stack forming station; and, means in the tier forming station responsive to reverse return movement of the respective transfer sheet for depositing the tier therein.

7. The system as set forth in claim 6 wherein said articles are rectangularly prismatic and further including:

a rectangular pallet of given length and width positioned in said stack forming station for receiving the tiers deposited therein;

a row forming conveyor for each of said first and second tier forming stations; and, conveyor control means for individually orienting each article rotationally about a vertical axis and for positioning each article with respect to an adjacent article in a row so that each tier has a rectangular perimeter corresponding substantially to the perimeter of the pallet.

8. The system as set forth in claim 7 wherein said conveyor control means is operative to form gaps between articles in selected rows and to form first and second tiers including such rows which eliminate vertical alignment of gaps in said tiers.

9. A method for forming a vertical stack of multiple tiers of articles, each tier in turn formed of a plurality of rows of the articles, said method comprising the steps of:

(1) providing a stack forming station in which tiers are sequentially deposited;

(2) providing a first tier forming station in which first tiers of articles are formed;

(3) arranging the articles in a row on a first conveyor system and positioning the row in the first tier forming station;

(4) positioning a first transfer sheet in said first tier forming station adjacent a lateral edge of said first conveyor system;

(5) incrementally indexing said first transfer sheet away from the lateral edge of said first conveyor system in a direction transverse to the row positioned in said first tier forming station by a distance equal to the width of said row;

(6) sequentially moving individual rows onto the transfer sheet to form a first tier; and, (7) moving the transfer sheet into the stack forming station to deposit the tier therein.

10. A method for forming a vertical stack of multiple tiers of articles, each tier in turn formed of a plurality of rows of the articles, said method comprising the steps of:

(1) providing a stack forming station in which tiers are sequentially deposited;

(2) providing first and second tier forming stations in which respective first and second tiers of articles are formed;

(3) positioning individual rows of articles sequentially in each of said stations;

(4) positioning an indexing transfer sheet in each tier forming station;

(5) indexing each transfer sheet transversely with respect to a row in the tier forming station by an incremental distance equal to the width of said row;

(6) moving individual rows sequentially positioned in a tier forming station onto the respective transfer sheet to form a tier;

(7) alternately moving the first and second transfer sheets into the stack forming station; and, (8) depositing the tier in the stack forming station in response to reverse return movement of the respective transfer sheet.-

* * * * *